(12) United States Patent
Cooper et al.

(10) Patent No.: US 6,225,723 B1
(45) Date of Patent: May 1, 2001

(54) ELECTRIC MACHINE AND ROTOR FOR USE THEREIN

(75) Inventors: John Cooper, Hemel Hempstead; David Bonnieman, Bushey Heath, both of (GB)

(73) Assignee: Lucas Industries Limited, London (GB)

( * ) Notice: Subject to any disclaimer, the term of this patent is extended or adjusted under 35 U.S.C. 154(b) by 0 days.

(21) Appl. No.: 09/432,303

(22) Filed: Nov. 2, 1999

(30) Foreign Application Priority Data

Nov. 3, 1998 (GB) .................................................. 9823924

(51) Int. Cl.[7] ...................................................... H02K 3/48
(52) U.S. Cl. ......................... 310/214; 310/218; 310/215; 310/269
(58) Field of Search ..................................... 310/214, 179, 310/198, 215, 216, 217, 218, 208, 262, 269

(56) References Cited

U.S. PATENT DOCUMENTS

| | | | |
|---|---|---|---|
| 4,748,354 | 5/1988 | Toshima | 310/60 A |
| 5,973,432 * | 10/1999 | Katagiri et al. | 310/214 |

FOREIGN PATENT DOCUMENTS

| | | | |
|---|---|---|---|
| 59213244 | 3/1984 | (EP) | H02K/1/24 |
| 2465349 | 9/1979 | (FR) | H02K/1/24 |
| 0079584 | 11/1982 | (FR) | H02K/3/18 |

OTHER PUBLICATIONS

Anderson et al., "electric motors", Theodore Audel & co., cover page, and , p. 12–15, 1895.*

* cited by examiner

Primary Examiner—Nestor Ramirez
Assistant Examiner—Thanh Lam
(74) Attorney, Agent, or Firm—Ohlandt, Greeley, Ruggiero & Perle, L.L.P.

(57) ABSTRACT

A rotor for use in an electric machine and a rotary electric machine utilizing such a rotor, the rotor comprising a rotor body provided with a plurality of slots, each slot housing electrical conductors of two independent rotor coils, the conductors being secured in position by an outer wedge member, an inner wedge member being located between the outer wedge member and the conductors, the rotor including pole tips defining load bearing lips located adjacent the radially outer edges of each slot, wherein a part of each coil projects beyond the respective lips in a direction perpendicular to the axis of the coil.

2 Claims, 1 Drawing Sheet

ELECTRIC MACHINE AND ROTOR FOR USE THEREIN

BACKGROUND OF THE INVENTION

This invention relates to an electric machine, for example a generator suitable for use in aerospace applications, and to a rotor suitable for use in such an application.

In aerospace applications, it is common for the rotor of a generator to rotate at high operating speeds, for example at speeds in excess of 24000 rpm. As tight volume and weight constraints apply to components for use in aerospace applications, it is desirable to provide an electrical generator which is capable of producing a high output without significantly increasing the dimensions of the generator.

Existing generator rotors have been designed in such a way that flux saturation of parts of the rotor material occurs. In order to increase the available output of the generator, it is desirable to increase the amount of pole material without increasing the overall dimensions of the rotor. It is an object of the invention to provide an electric machine and a rotor for use therein which permits the amount of pole material to be increased for a rotor of given dimensions.

BRIEF SUMMARY OF THE INVENTION

According to the present invention there is provided a rotor for use in an electric machine, the rotor comprising a rotor body provided with a plurality of slots, each slot housing electrical conductors of two independent coils, the conductors being secured in position by an outer wedge member, an inner wedge member being located between the outer wedge member and the conductors, the rotor including pole tips defining load bearing lips located adjacent the radially outer edges of each slot, wherein a part of each coil projects beyond the respective lips in a direction perpendicular to the axis of the coil.

By arranging for the coils to project beyond the load bearing lips, for a coil composed of a given number of turns of a conductor of given dimensions, an increased amount of pole material is available. In effect, the parts of each coil located within two adjacent slots are spaced apart from one another by an increased amount. In order to accommodate the conductors within the slots without increasing the dimensions of the rotor, the inner and outer wedge members are conveniently of modified shape.

Preferably the face of the outer wedge presented to the inner wedge is recessed in its region(s) of contact with the inner wedge.

BRIEF DESCRIPTION OF THE DRAWINGS

The invention further relates to an electric machine, for example an electrical generator, including such a rotor.

The invention will further be described, by way of example, with reference to the accompanying drawings, in which.

DETAILED DESCRIPTION OF THE INVENTION

Figure 1:
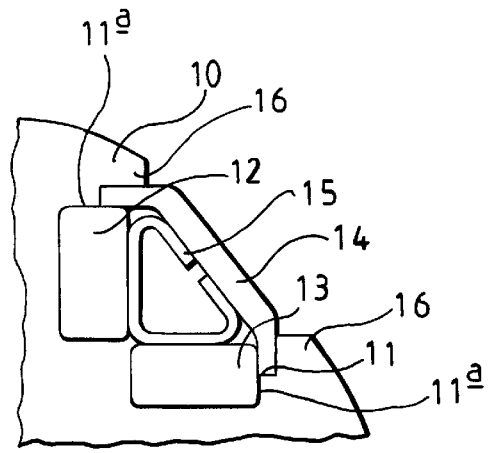
FIG. 1 is a diagrammatic sectional view illustrating part of a conventional rotor for an electric machine.

FIG. 1 illustrates part of a conventional rotor arrangement for use in an electrical generator. The rotor arrangement of FIG. 1 comprises a laminated rotor body 10 formed with four equi-angularly spaced slots 11 such that the rotor 10 defines four equi-angularly spaced, radially outwardly extending limbs (poles) around which coils 12, 13 are wound. The radially outer region of each pole defines a pole tip, each slot 11 being arranged to house electrical conductors forming parts of two of the coils 12, 13 of the rotor winding of the generator. The coils 12, 13 are held in place in the slots 11 by means of outer wedge members 14, and inner wedge members 15.

Each slot 11 is shaped so as to be of symmetrical form, the sides of the slot 11 being of stepped form, each side of the slot 11 defining an inner step 11a which serves to locate the radially outermost part of each coil 12, 13, and an outer step or lip 16 which serves to locate the associated outer wedge member 14.

As shown in FIG. 1, approximately 50% of the thickness of each coil 12, 13 engages the step 11a, the remaining 50% of the thickness of each coil 12, 13 engaging a respective end part of the outer wedge member 14. It will further be appreciated that all of the end part of the outer wedge member 14 which is in engagement with one of the coils 12, 13 is fully supported by the adjacent lip 16.

In use, if the generator of which the rotor forms part is used in an aerospace application, then the rotor will be rotated at high speed, for example at speeds up to 24000 rpm. It will be appreciated that at such high speeds, a large magnitude centrifugal force is applied by each coil 12, 13 to the adjacent steps 11a and through the outer wedge members 14 to the lips 16. The rotor 10 and the outer wedge members 14 are designed to be able to withstand the application of these forces.

As described hereinbefore, the arrangement of FIG. 1 suffers from the disadvantage that magnetic flux saturation of parts of the rotor material occurs. In order to provide a rotor suitable for use in a generator capable of producing an increased output power but without increasing the dimensions of the rotor, in accordance with the invention, the coils 12, 13 are shifted to positions in which parts of each coil 12, 13 extend beyond the associated lips 16 in a direction perpendicular to the axis of that coil 12, 13. Such an arrangement is illustrated in FIG. 2.

Figure 2:
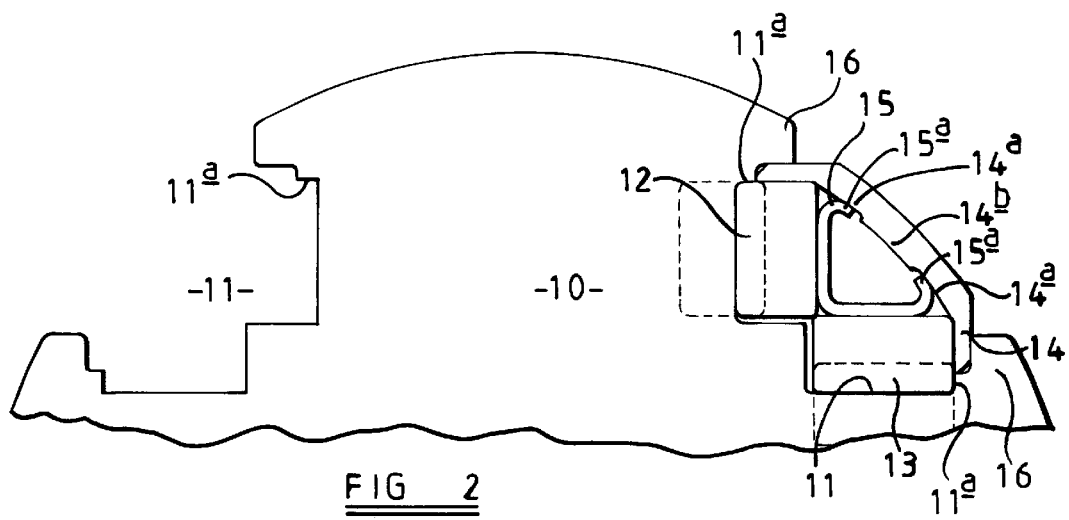
FIG. 2 is a view similar to FIG. 1 illustrating part of a rotor in accordance with an embodiment of the invention.

As shown in FIG. 2, by moving the coils 12, 13 from their conventional positions (illustrated by the dashed lines in FIG. 2) to the positions illustrated in solid lines in FIG. 2, the parts of each coil 12, 13 located within adjacent ones of the slots 11 are spaced apart by a greater distance from the axis of that coil, and as a result the limbs of the rotor 10 around which the coils 12, 13 are formed can be of increased thickness. As a result, a greater quantity of rotor material is present in the limbs, and the power output of a generator including the rotor can be increased.

In order to permit the coils 12, 13 to be moved to positions in which they project beyond the lips 16, the inner and outer wedge members 14, 15 are of modified shape. In particular, each outer wedge member 14 is shaped to include recesses 14a, a central part 14b of the outer wedge member 14 being of substantially equal thickness to that of the conventional arrangement illustrated in FIG. 1. The recesses 14a are shaped to receive end regions 15a of the adjacent inner wedge member 15, the end regions 15a being of reduced length compared to the arrangement illustrated in FIG. 1.

As a result of shifting the positions of the parts of the coils 12, 13 located within the slots 11, it will be appreciated that a reduced proportion of each of the coils 12, 13 cooperates with the steps 11a, a greater proportion of the centrifugal force being applied through the outer wedge member 14 to the lips 16. The lips 16 are designed to be of sufficient strength to withstand the application of the greater proportion of the centrifugal force thereto. Further, as the parts of the outer wedge members 14 which engage the coils 12, 13 are not completely directly supported by the lips 16, the outer wedge members 14 must be of sufficient strength to transmit the application of the centrifugal force to the lips 16.

The outer and inner wedge members 14, 15 are conveniently constructed from titanium and beryllium copper, respectively. This choice of materials is advantageous in that these materials are of sufficient strength to withstand the application of the centrifugal forces thereto by the coils 12, 13, in use. Although each outer wedge member 14 is shaped to include recesses 14a, the provision of the recesses 14a does not significantly weaken the outer wedge member 14, analysis having shown that it is the thickness of the central region 14b which is of importance in preventing bending of the outer wedge member 14.

Although in the description hereinbefore, it is assumed that the power output of the generator is to be increased without increasing the dimensions of the generator, it will be appreciated that the invention may be used in providing a generator of reduced dimensions which is capable of producing the same power output as a conventional generator of greater dimensions.

Although the description hereinbefore is of the use of the rotor in a generator, it will be appreciated that the invention is also applicable to other types of rotary electric machine.

What is claimed is:

1. A rotor for use in an electric machine, the rotor comprising:

a rotor body provided with a plurality of slots, each slot housing electrical conductors of two independent rotor coils, the conductors being secured in position by an outer wedge member, an inner wedge member being located between the outer wedge member and the conductors, the rotor including pole tips defining load bearing lips located adjacent the radially outer edges of each slot, wherein a part of each coil projects beyond the respective lips in a direction perpendicular to the axis of the coil, wherein each said outer wedge member spans its respective slot in a circumferential direction of the rotor and overlies the conductors in that respective slot, each outer wedge member extending, at its circumferential ends, beneath the respective load bearing lips of the respective pole tips, to distribute load thereto in use, wherein each said inner wedge member engaging its respective outer wedge member at two spaced locations adjacent respectively the points of engagement of the outer wedge member with the respective pole tips, and wherein said outer wedge member having a greater radial thickness in the region thereof between said two locations than its thickness at said two locations.

2. A rotary electric machine comprising:

a rotor having a rotor body provided with a plurality of slots, each slot housing electrical conductors of two independent rotor coils, the conductors being secured in position by an outer wedge member, an inner wedge member being located between the outer wedge member and the conductors, the rotor including pole tips defining load bearing lips located adjacent the radially outer edges of each slot, wherein a part of each coil projects beyond the respective lips in a direction perpendicular to the axis of the coil, wherein each said outer wedge member spans its respective slot in a circumferential direction of the rotor and overlies the conductors in that respective slot, each outer wedge member extending, at its circumferential ends, beneath the respective load bearing lips of the respective pole tips, to distribute load thereto in use, wherein each said inner wedge member engaging its respective outer wedge member at two spaced locations adjacent respectively the points of engagement of the outer wedge member with the respective pole tips, and wherein said outer wedge member having a greater radial thickness in the region thereof between said two locations than its thickness at said two locations.

* * * * *